May. 13, 1924.

L. McCOY

CANDY CUTTING MACHINE

Filed Jan. 2, 1923 — 2 Sheets-Sheet 1

1,494,263

Lester McCoy, INVENTOR.

BY

ATTORNEY.

Patented May 13, 1924.

1,494,263

UNITED STATES PATENT OFFICE.

LESTER McCOY, OF DENVER, COLORADO.

CANDY-CUTTING MACHINE.

Application filed January 2, 1923. Serial No. 610,314.

*To all whom it may concern:*

Be it known that I, LESTER McCOY, a citizen of the United States, residing in the city and county of Denver and State of Colorado, have invented certain new and useful Improvements in Candy-Cutting Machines, of which the following is a specification.

This invention relates to candy cutting machines of the type in which a stream of soft candy is cut into equal sized pieces, commonly known as "pillows," and has for its principal object, the provision of a device of this character in which knives will move into the candy from several directions, thereby forming a particular design on the cut end of the candy.

Another object of the invention is to provide positive means for registering the knives simultaneously with each other within the stream of candy.

Still another object is to provide adjustable means upon the knives for forcing and holding the stream of candy in proper position to be cut.

Other objects and advantages reside in the detail construction of the invention, which result in simplicity, economy, and efficiency, and which will become more apparent from the following description.

In the following detailed description of the invention, reference is had to the accompanying drawing which forms a part hereof. Like numerals refer to like parts in all views of the drawing and throughout the description.

Figure 5:
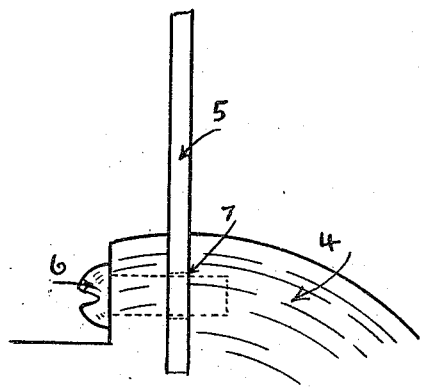
Figs. 5 and 6 are detail views, showing a method for attaching the knives to their hubs.
Figure 6:
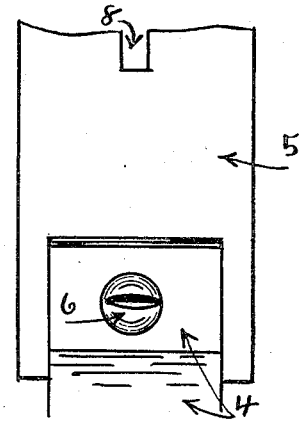

The invention comprises a series of rectangularly disposed shafts 3, rotatably mounted in bearings 1. Each of the shafts 3 carries at each of its extremities, a miter gear 2, which meshes with the miter gear, carried by the adjacent shaft. Mounted midway on each of the shafts 3 is a hub 4 which carries a series of radially extending knives 5. The knives 5 may be secured to the hub 4 in any desired manner, such as shown in Figs. 5 and 6 in which a radial slot 7 is formed in the hub to receive knife 5 which is held therein by means of a screw 6.

The bottom of the slot 7 and the end of the knife 5, should accurately contact, so that the knife will be rigidly held at right angles to the shaft 3. The free extremity of each of the knives 5 is rectangularly pointed so that when the knives from the four series of knives come simultaneously together, the edge of each knife will co-act with the edge of each adjacent knife.

One of the shafts 3 is revolved from any suitable source of power.

The operation of the device is as follows:

The candy is spun from the batch in a long continuous stream, which is passed from a trough 11, downward through the center of the machine over the co-acting knives. The knives are revolved inward at the top, and engage the stream of candy pulling it downward from the trough until they co-act with each other and cut a piece of candy from the stream. This operation is continuous. Each piece of candy will be uniform in length, its length depending upon the spacing of the knives in each series.

Figure 1:
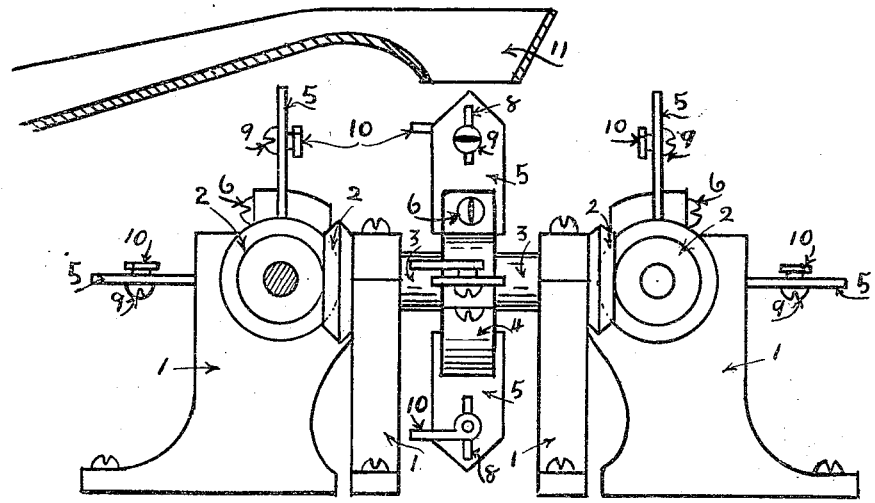
Fig. 1 is a side elevation of an embodiment of the improved candy cutting machine.
Figure 2:
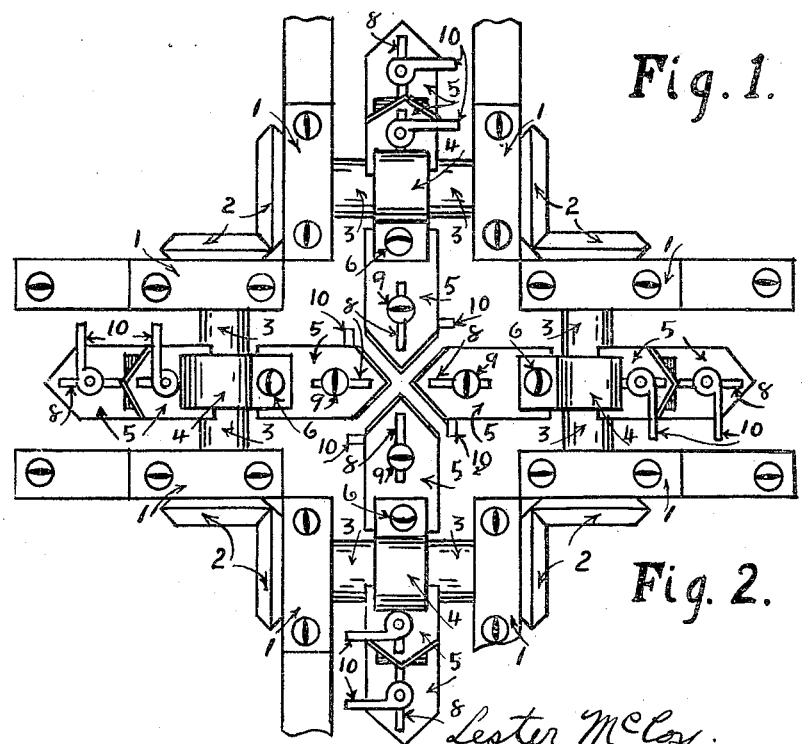
Fig. 2 is a fragmentary plan view of the same with the candy trough removed.
Figure 3:
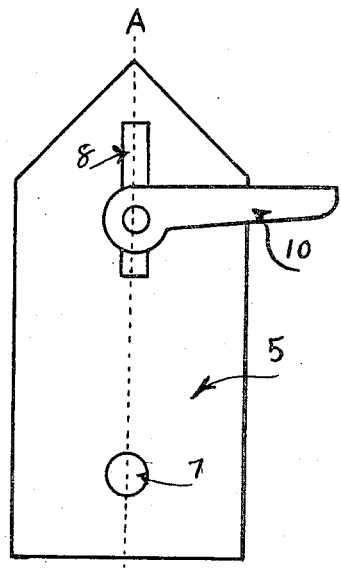
Fig. 3 is a detail view of the cutting knives.
Figure 4:
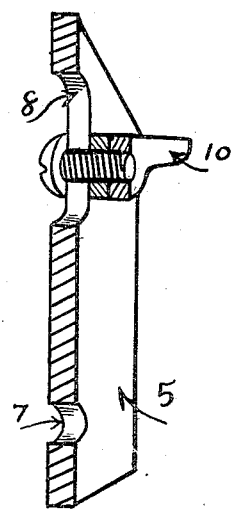
Fig. 4 is a perspective section through the knife, taken on the line, A—A, Fig. 3.

In order to hold the stream of candy at the mid-point of the machine, and prevent it from flowing out between the knives, each knife is provided with a projecting arm 10 which is spaced below the surface of the knife, as shown in Fig. 4, and should the candy be to one side of the center, will come in contact therewith before the knife and act to force the candy to the center of the machine. The arms 10 are secured to the knives 5 by means of clamp screws 9 which pass through slotted openings 8. The position of the arm 10 on the knife may be adjusted by moving the screw 9 along the slotted opening 8. The angle of projection of the arm 10 is also adjustable, the most efficient angle having been found to be such that the arm 10 will project at 45 degrees from the axis of the knife, and at 90 defrees from the edge of the knife, so that it will force the candy to the center and close the opening between the adjacent knives before the knives come together.

When using four series of knives, as illustrated, the cut end of the candy will present the appearance of a regular cross which results in a very ornamental and novel effect.

While a specific form of the improvement has been described and illustrated herein, it is desired to be understood that the same may be varied, within the scope of the appended claim, without departing from the spirit of the invention.

Having thus described the invention, what is claimed and desired to be secured by Letters Patent is:

A candy cutting machine comprising two or more, coacting, radially-placed series of revolving knives; adjustable arms revolving with said knives for holding the candy in position and means for bringing the knives in each series into a stream of candy simultaneously with the knives of each other series.

LESTER McCOY.